United States Patent [19]

Gordon

[11] 4,431,534
[45] Feb. 14, 1984

[54] LIQUID-LIQUID SEPARATION APPARATUS

[75] Inventor: Michael P. Gordon, Metairie, La.

[73] Assignee: Exxon Production Research Co., Houston, Tex.

[21] Appl. No.: 401,183

[22] Filed: Jul. 23, 1982

[51] Int. Cl.³ ............................................. B01D 21/00
[52] U.S. Cl. .................................. 210/110; 210/242.3; 210/923
[58] Field of Search ............ 210/109, 923, 110, 242.3, 210/538, DIG. 5

[56] References Cited

U.S. PATENT DOCUMENTS

| | | | |
|---|---|---|---|
| 2,003,140 | 5/1935 | Dehn | 210/538 X |
| 3,224,593 | 12/1965 | Nebolsine | 210/519 |
| 3,752,318 | 8/1973 | DeRouen et al. | 210/251 |
| 3,756,409 | 9/1973 | Carmichael et al. | 210/104 |
| 3,797,203 | 3/1974 | Murdock, Sr. | 210/DIG. 5 |
| 3,893,918 | 7/1975 | Favret, Jr. | 210/84 |
| 4,146,482 | 3/1979 | Shyu | 210/242.3 |
| 4,252,649 | 2/1981 | Favret, Jr. | 210/110 |

Primary Examiner—Frank A. Spear, Jr.
Attorney, Agent, or Firm—John S. Schneider

[57] ABSTRACT

Apparatus is disclosed for separating a multiphase liquid mixture of lighter and heavier liquids which includes a caisson into which the liquid mixture is introduced. A surge plate extends horizontally across the interior of the caisson dividing it into upper and lower sections. The lower section forms a reservoir for receiving the liquid mixture. A wier plate extends vertically from the surge plate forming a reservoir and a spillover bucket chamber in the upper section for the lighter liquid. An opening in the surge plate communicates the lower and upper section reservoirs. Means are provided for supplying liquids to the lower section reservoir and for removing the lighter liquid from the bucket chamber.

5 Claims, 2 Drawing Figures

LIQUID-LIQUID SEPARATION APPARATUS

BACKGROUND OF THE INVENTION

The present invention concerns apparatus for separating imiscible lighter and heavier liquids and, in particular, hydrocarbon liquids and the like from water. More particularly, the invention concerns a liquid-liquid separator for use in a body of water for separating and removing crude oil from waste water, and specifically, waste water discharged from an offshore drilling platform.

Waste water disposal caissons are available which remove oil from waste water through the use of an internal spillover wier located above the means water level of the body of water in which such caissons are arranged. These caissons, however, are susceptible to the potentially adverse effect of wave action; namely, that the oil/water interface level in the caissons might momentarily rise above the spillover wier and allow water to enter the oil chamber from which it is desired to pump only oil.

The present invention restricts the upward flow of liquids in the upper section of that type caisson such that even under storm conditions, the oil level is increased only slightly during a rise in the water level immediately surrounding the caisson. This oil level falls an equivalently small amount when the water level immediately surrounding the caisson falls. A surge plate is located in the upper section of the caisson. A small hole in the surge plate restricts upward flow of liquids caused by wave action yet does not restrict downward flow of the inlet liquids and solid particles, such as sand.

A further advantage of the surge plate concept is that since the oil spillover wier does not have to be elevated much above the expected high mean water level, a smaller oil layer will be formed in the upper section of the caisson reducing thereby the possibility that the lower level of the oil level i.e. the oil-water interface will fall below the water inlet terminus.

SUMMARY OF THE INVENTION

This invention concerns apparatus for separating a multi-phase liquid mixture of lighter and heavier liquids which includes an open-ended cylindrical vessel having a surge plate extending across the interior dividing the vessel into two sections. One of the sections forms a first reservoir for the liquids. A wier plate extends from the surge plate forming in the other section a second reservoir and a chamber for the lighter liquid. The surge plate has an opening which communicates the two reservoirs. Means are provided for supplying liquids to the first reservoir and means are provided in the chamber for removing the lighter liquid from the chamber.

DETAILED DESCRIPTION OF THE INVENTION

Figures 1, 2:
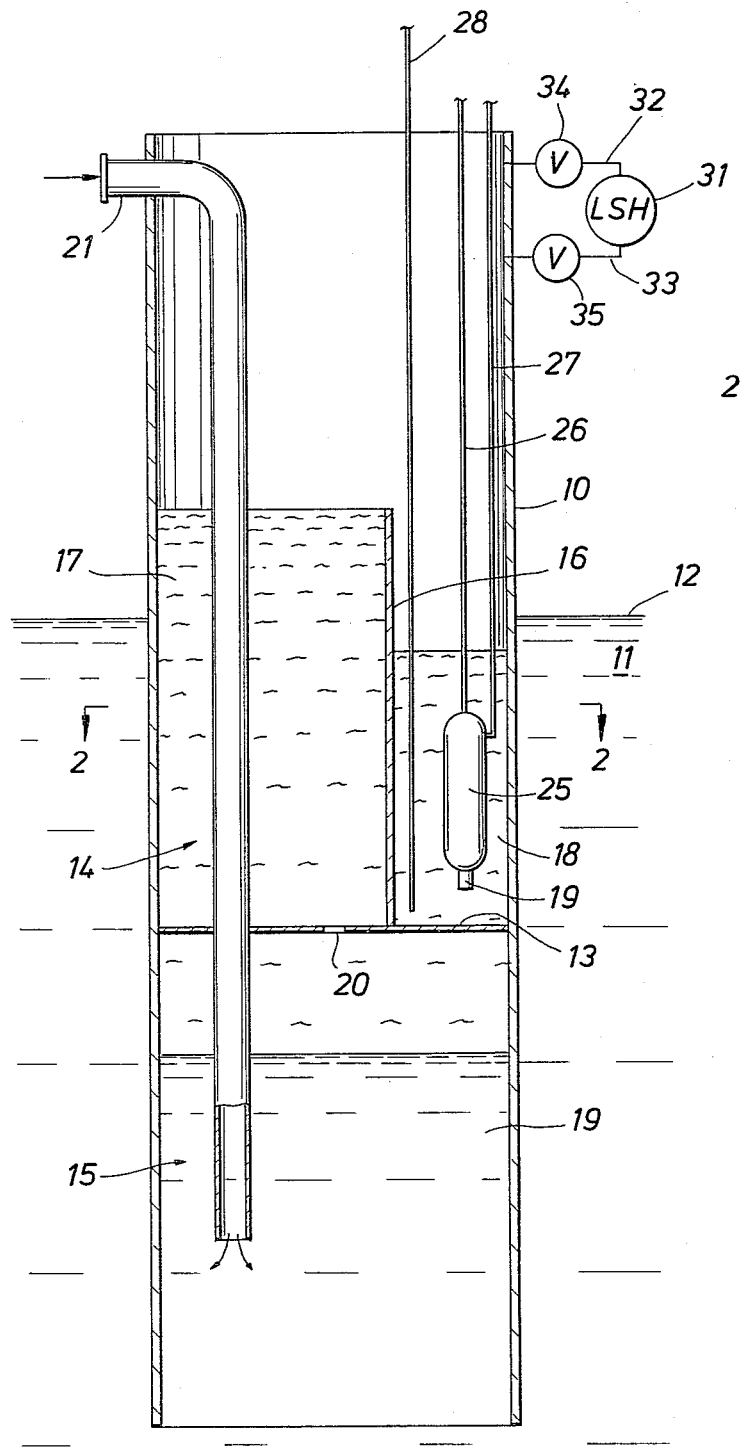
FIG. 1 is a vertical, sectional view of the liquid-liquid separation apparatus arranged in accordance with the invention.
FIG. 2 is a view taken on lines 2—2 of FIG. 1.

Referring to the drawings, an open-ended cylindrical caisson 10 is positioned in a body of water 11 adjacent an off-shore platform or other oil and gas drilling or producing facility, not shown. The high mean water level of the body of water 11 is indicated at 12. Caisson 10 is arranged upright in the body of water 11. A horizontal surge plate 13 is permanently fixed in the caisson and divides caisson 10 into upper and lower sections, 14 and 15, respectively. A wier plate 16 is permanently affixed to surge plate 13 and extends vertically in section 14 to form an oil reservoir 17 and an oil bucket chamber 18. Lower section 15 forms an oil and water reservoir 19.

Surge plate 13 contains a small hole 20 communicating between reservoirs 17 and 19.

A waste water inlet 21 passes through upper section 14 and surge plate 13 into lower section 15, as shown.

A pump 25 is arranged in bucket chamber 18. It is furnished with a check valve 19 at its lower end which permits flow into but prevents flow from pump 25. This pump may be suitably a conventional double-diaphragm pneumatic type pump. A conduit 26 supplies gas, such as air, to pump 25 to operate the pump and an outlet conduit 27 discharges oil from pump 25.

Another tubing 28 extends through the open upper end of caisson 10 into bucket chamber 18. It is open at its lower end and is connected to a level indicator at the surface to determine the level of the oil in bucket chamber 18. This level is determined by measuring back pressure when a steady flow of gas is put into tubing 28 from a point, not shown, outside of caisson 10.

The level indicator may be a conventional separate float controller, not tubing 28, which turns on pump 25 when the level in oil bucket 18 rises above a pre-set or pre-selected level. Such level indicator is connected to a suitable control for controlling operation of pump 25. Another level control may be provided by a float arranged in a liquid safety high float vessel 31 which is connected to the interior of caisson 10 by lines 32 and 33 which contain valves 34 and 35, respectively.

Water and oil flow through inlet conduit 21 to lower section 15 in which the oil and water separate. Hydrostatic head determines elevation of the oil/water interface. Water downflows through caisson 10 with the excess water leaving through the open end of the bottom of caisson 10 for disposal in the surrounding body of water 11. Solid particles also fall to the open bottom of caisson 10 and out into the surrounding body of water 11 preferably tumbling over baffles, not shown, while traveling down the caisson. Oil flows through small hole 20 into the upper section reservoir 17. Excess oil overflows wier plate 16 and spills into oil bucket chamber 18 where a level controller connected to tubing 28 turns pump 25 on and off to keep the oil level within pre-set limits. The oil is pumped by means of gas supplied through conduit 26 from the caisson through conduit 27 to an appropriate oil storage vessel.

The operation is automatically controlled by line 28 and controls, not shown, connected to it. The upper level safety high float controls flow of the waste water into inlet 21 by controlling a valve, not shown, on that inlet.

The caisson can be formed of various shapes other than cylindrical. Also, different type pumps might be used instead of gas-operated pump 25. For example, an electrically operated pump might be used instead. Other changes in the configuration and components of the apparatus may be made without departing from the spirit and scope of the invention.

I claim:

1. Apparatus for separating a multi-phase liquid mixture of lighter and heavier liquids comprising:

an upright, open-ended cylindrical vessel positioned in a body of water;

a surge plate extending horizontally across the interior of said vessel dividing said vessel into upper and lower sections;

said lower section forming a reservoir for said liquids;

a weir plate extending vertically from said surge plate forming in said upper section a reservoir and a bucket chamber for said lighter liquid; the upper edge of said weir plate being located above the expected high mean water level of said body of water;

said surge plate having a small opening therethrough communicating said lower and said upper section reservoirs;

inlet means for supplying said liquids to said lower section reservoir extending from the upper end of said cylindrical vessel through said surge plate into said lower section; and pump means in said bucket chamber for removing said lighter liquid from said bucket chamber.

2. Apparatus as recited in claim 1 wherein said multiphase liquid mixture comprises waste water discharged from an offshore drilling platform.

3. Apparatus as recited in claim 2 in which said pump comprises a gas-operated pump.

4. Apparatus as recited in claim 3 including means for operating said pump responsive to the level of said lighter liquid in said bucket chamber.

5. Apparatus as recited in claim 4 including control means for terminating flow of fluids into said caisson in response to the level of said lighter liquid in said upper section of said caisson.

* * * * *